United States Patent [19]

Minden

[11] 4,387,704
[45] Jun. 14, 1983

[54] MULTI-MODE SOLAR HEAT RECOVERY DEVICE

[76] Inventor: Carl S. Minden, 314 Federal Heights Cir., Salt Lake City, Utah 84103

[21] Appl. No.: 280,777

[22] Filed: Jul. 6, 1981

[51] Int. Cl.³ .................................................. F24J 3/02
[52] U.S. Cl. ..................................... 126/435; 126/437; 126/438
[58] Field of Search ............... 126/429, 430, 431, 432, 126/433, 435, 436, 437, 417, 450; 62/235.1

[56] References Cited

U.S. PATENT DOCUMENTS

| | | | |
|---|---|---|---|
| 4,026,269 | 5/1977 | Stelzer | 126/438 |
| 4,079,725 | 3/1978 | Chadick | 126/438 |
| 4,095,369 | 6/1978 | Posnansky | 126/438 |
| 4,143,640 | 3/1979 | Pierce | 126/438 |
| 4,209,222 | 6/1980 | Posnansky | 126/438 |
| 4,223,664 | 9/1980 | Fattor | 126/438 |
| 4,232,820 | 11/1980 | Ritter | 126/435 |
| 4,281,639 | 8/1981 | Kuronen | 126/435 |
| 4,284,069 | 8/1981 | Horster | 126/438 |
| 4,304,218 | 12/1981 | Karlsson | 126/438 |
| 4,313,424 | 2/1982 | Schreyer | 126/435 |

Primary Examiner—Daniel J. O'Connor
Attorney, Agent, or Firm—Thorpe, North & Western

[57] ABSTRACT

A multi-mode solar heat recovery device for use at an interior surface of a window. The device includes heat conductive plates for heat absorption of sunlight, reflected from corresponding light reflective surfaces. Each heat conductive plate includes heat conductive tubing and carrier fluid to convey the heat from the plate to a point of heat utilization, such as a water heater or space heater. Regulation of the heat recovery device is provided by automatic adjustment of the light reflective surfaces to variable orientations with respect to the incident sunlight and heat conductive plates. This variable orientation permits selection of (i) essentially complete light blockage when adjusted to a closed position, (ii) maximum light reflection to a heat absorbing surface when at an intermediate position and unobstructed transmittance of light when in a fully opened position. The heat recovery device is further adapted with a convection heat collector which may be utilized as a cooling device. The solar heat recovery device and convection heat collector may also be used collectively as part of an overall temperature control system which includes two water storage tanks which permit two temperature level heat recovery and heat utilization. Furthermore, this system can be adapted for full environmental control with an evaporative and radiant cooling system to complement the heat recovery system.

21 Claims, 8 Drawing Figures

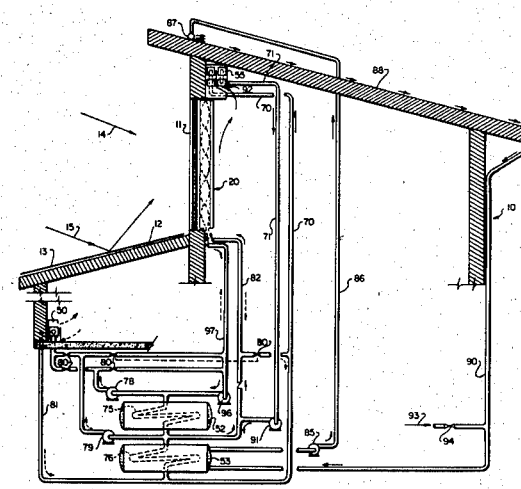

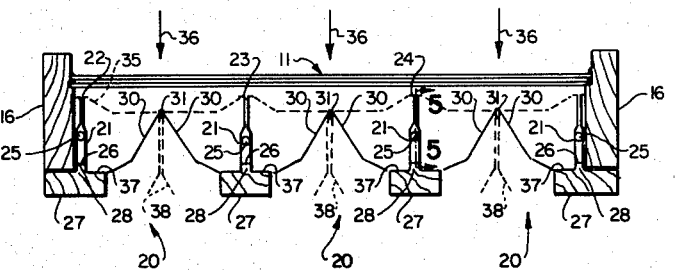

MULTI-MODE SOLAR HEAT RECOVERY DEVICE

BACKGROUND OF THE INVENTION

1. Field of the Invention

The present invention relates to a combined active/passive heat recovery system utilized on the interior of a building structure having windows exposed to solar radiation. More specifically, the subject invention relates to such heat recovery systems wherein system regulation is developed pursuant to the use of indirect exposure of sunlight which is controlled by a reflective surface at the window opening.

2. Prior Art

The utilization of solar energy for low temperature level heating in residences as well as commercial and industrial buildings has moved over the past several decades through a number of phases involving both active and passive systems. Early work was directed toward so-called active systems utilizing external flat plate collectors located on a sloping roof to maximize radiation. Typically these collectors consisted of one or more glass sheets through which solar radiation passed to a heat absorbing surface, with water or other fluid circulated through tubing in thermal contact with the absorbing surface, and with the sides and bottom of the collector insulated to control heat loss. In these systems heat is commonly stored in remotely located water storage tanks for use either for space heating or heating of domestic water.

Disadvantages inherent in the conventional flat plate collector system are primarily the relatively low overall efficiency of the system and problems intrinsic in locating collectors external to a house or building, such as the cost of providing adequate structural support, weather resistance, insulation and freezing protection, as well as high temperature protection during power outages or equipment malfunction.

Numerous variations of the flat plate collector have been developed in an effort to improve the cost/benefit ratio. These include reflector boosters to increase radiation intensity on the surface of the collector and thereby increase the amount of heat recovered at a given temperature level, internal shutters or louvers to reduce overheating problems during shut-off or malfunction, various automatic drainage systems or use of antifreeze to eliminate freezing problems, along with many other design improvements.

Somewhat parallel with the development of the water circulation and storage concept for flat plate collectors, various forms of circulating hot air systems were developed, some using rock bins for storing heat to be used at night or when required. Such circulating water and air designs have been the principal method of active solar energy systems.

Passive solar energy recovery systems have more recently become significant, particularly in the design of new homes. The trend has stemmed from a combined desire to improve aesthetics and reduce costs. Passive systems recover heat within a house or building by storing energy entering through a window as solar radiation in a thermal mass (as in a Trombe wall) for re-radiation into the room during nighttime hours.

Variations in the design of passive systems are numerous and include the use of louvers, shades, between-glass moveable insulation and reflectors, in addition to fixed and moveable heat storage walls, water tanks, change of phase tanks, insulating panels and the like—all in order to control room temperature more effectively during heating and cooling, increase heat storage, reduce nighttime heat losses and cost. Passive systems tend to have the advantage of improved aesthetics and internal location of components, thus eliminating the weather resistance and insulating requirements of conventional flat plate collectors. Normally they require the use of somewhat massive walls or tanks which restrict flexibility of remodeling and result in unconventional design. In many cases, incorporating large masses into a building design imposes severe structural problems. Possibly the most serious limitations of passive systems are their restricted heat storage capability and the cost problem imposed by their limited application to mass production. Also, passive systems tend to have little temperature control flexibility. Passive designs tend to be an extension of good, energy efficient house or building design, rather than a separate apparatus as characterized by the active solar energy systems.

Various types of active-passive systems have been proposed in an effort to combine the advantages of each. Some utilize circulating liquid or air within the active component, and some propose louvers or shutters to limit daytime heat gain and reduce nighttime heat loss in an otherwise passive system. Some units recommended for greenhouse environments have utilized rotating collector plates which have heat absorption material on one side and reflective material on the other. Heat conductive tubes are disposed between these materials and in thermal contact with the heat absorptive material. These collector plates have been alternatively rotated from a total absorption orientation wherein the absorptive material is positioned against the window in direct exposure to sunlight, to a total reflective mode where the reflective side of the plate is positioned against the window. Such greenhouse systems have not been ideal, however, due to mechanical difficulties in coupling fluid lines to the movable collector plates. Furthermore, the mechanical rotating means have not been well suited for simple applications within a residence where dependable operation and an aesthetic appearance are both essential.

OBJECTS AND SUMMARY OF THE INVENTION

It is therefore an object of the present invention to provide a heat recovery system suitable for interior use within a building structure and adapted to maximize heat transfer from solar radiation into a fluid circulation and storage system which may be used for domestic hot-water heating, as well as a source for space heating.

It is a further object of the present invention to provide such an heat recovery system which is capable of presenting an architecturally aesthetic appearance, while preserving safety and failsafe features required for internal systems.

It is a still further object of this invention to provide a heat recovery device which can be regulated between the extremes of maximum heat recovery and maximum heat rejection with a single reflective system.

These and other objects are realized in the present invention which comprises a multi-mode solar heat recovery device for use in an active-passive system which eliminates many of the adverse features of prior art active, passive and active/passive systems. For example, all components (except for the optional use of an external reflector booster) are located internal to the house or building in which the device is installed, thus minimizing structural requirements and avoiding weather protection problems, freezing problems and the need for extensive insulation to limit collector heat loss. The system also provides the internal location advantages of a passive system and in addition provides for:
   a. A high degree of flexibility in terms of day or nighttime temperature control,
   b. multiple use of recovered heat, such as combined space and domestic water heating,
   c. remote location of heat use or heat storage, and
   d. the potential for large scale heat storage and, thereby, reduce use of supplemental heating.

The invention concept includes the use of rotating reflectors located adjacent to a heat absorbing surface which, by means of a single mechanical action, accomplishes all of the following operations:
   a. Efficient recovery of heat from solar radiation during sunlight hours,
   b. low level nighttime heat loss during cold weather,
   c. low level daytime heat gain during hot weather,
   d. transmittance of sunlight into a house or building equipped with the device, either for passive heating purposes or for aesthetic reasons when light intensity is low,
   e. protection against high temperatures during power outages or other types of malfunction by automatically returning the rotating reflectors to their maximum heat rejection position.

The system recovers heat, stores heat and utilizes stored heat in separate tanks at different temperature levels, thereby substantially improving over-all operating efficiency compared with single temperature level heat collector/heat storage designs. The system is readily adaptable to the use of an external reflector booster, without imposing high temperature design requirements on the heat collector units. Furthermore, the internal radiant heat collectors can be used as space heaters when not recovering solar heat, thereby minimizing equipment requirements.

The system provides for alternate use as an effective cooling device without significant additional cost. During wintertime operation, two storage tanks operating at different temperature levels are utilized as described above. In summertime, operating conditions may be adjusted to permit one storage tank to be used to store cold water for cooling purposes.

DESCRIPTION OF THE DRAWINGS

FIG. 1 is a schematic diagram of a multi-mode heating/cooling system of the present invention.

FIG. 2 illustrates a top cross-section view of a radiant heat collector used with the system of FIG. 1 as taken along lines 2—2 of FIG. 3.

FIG. 3 is a front plan view of the radiant heat collector illustrated as item 20 in FIG. 2.

FIG. 4 is a partial, cross-sectional view of the radiant heat collector, taken along the lines 4—4 of FIG. 3.

FIG. 5 is a cross-sectional view of FIG. 2, taken along lines 5—5.

FIG. 6 illustrates a convection heat collector for use in connection with the radiant heat collector of FIG. 2.

FIG. 7 is a cross section taken along the lines 7—7.

FIG. 8 graphically illustrates heat recovery efficiency of the combined radiant and convection collectors as a function of temperature difference between outside temperature and the fluid temperature developed in the radiant heat collector.

DETAILED DESCRIPTION OF THE PREFERRED EMBODIMENT

Referring now to the drawings:

A multi-mode solar heat recovery device which is illustrative of the subject invention is set forth in FIG. 1 within the context of an actual building structure 10. Although any structure having window openings subject to direct sunlight could be used in connection with the subject invention, the architectural format illustrated in FIG. 1 operates to enhance such exposure. This is accomplished where the primary window openings 11 are oriented towards the sun and are positioned above a lower roof section 12 whose angle of inclination with respect to the window is adapted for mounting a reflecting surface 13 thereon. By utilizing this and other well-known structural designs, both direct 14 and indirect 15 radiation are received at the window 11 and may therefore be subject to solar heat recovery. Based on the disclosure made hereafter, it will be apparent to those skilled in the art that many types of exterior structure and window forms may be utilized in combination with the heat recovery device disclosed and claimed herein.

FIG. 1 further illustrates a device and method of installation for a complete heating/cooling system within the structure 10. It will be apparent to those skilled in the art that the hardware, fluid conveyance systems, radiant heat devices, tanks and actual control systems being applied herein are merely illustrative of numerous methods for accomplishing the desired objectives. It is therefore to be understood that structural symbols are to be broadly construed subject to substitutions and deviations from that depicted in the figures.

The principal aspect of the subject invention is structurally identified as the Radiant Heat Collector 20, which is positioned against the window 11 as illustrated.

This radiant heat collector may be structurally designed to fit within the window frame and cover the full vertical height thereof, or it may be designed for only partial coverage to retain a portion of conventional window appearance within the structure.

FIG. 2 illustrates the coordinated use of a plurality of such radiant heat collectors in side by side arrangement to span the whole width of the window 11. Here again, the present invention is adapted for application to less than the full window span, depending upon the heating requirements and overall structural design to be implemented.

FIG. 2 illustrates three modular units of the radiant heat collector 20 in top view. Their placement is shown adjacent to window structure 11 and within the window frame 16. This type of placement is preferable in view of the enclosing effect which can be developed in cooperation with the window frame and window which mutually cooperate to retain the captured heat within this closed area, as opposed to permitting dissipation into the remaining interior of the structure. To further enhance efficiency, it is preferable to utilize high transmittance glass as window material, with double pane structure to limit heat loss to the exterior of said window structure.

As illustrated in FIG. 2, the radiant heat collector includes at least one heat conductive plate 21 adapted at one edge for fixation near the window 11. Such fixation may be accomplished by attachment of the plate to the window casing 16, or it may be structurally mounted at top and bottom locations which stabilize the plate and edge thereof near the window as shown at points 22, 23 and 24. This heat conductive plate 21 has its surface area adapted with means to provide a high degree of heat absorption when exposed to sunlight. In view of optical and structural limitations which will become apparent in the subsequent discussion regarding reflection of incident radiation, its orientation is substantially perpendicular to the window 11.

The radiant heat collector further comprises at least one heat conductive tube 25 which is in thermal contact with the heat conductive plate 21, to transmit maximum heat from the conductive plate into the conductive tube 25. Such thermal contact may be developed by mere pressure contact between the imposing faces of the heat conductive plate and conductive tube, or it can be enhanced by the addition of interfacing material which has high heat transmissive properties. A variety of such methods are well within the knowledge of those skilled in the art.

The configuration of the heat conductive tube 25 along the interior surface of the heat conductive plate 21 is illustrated in FIG. 5. It will be apparent that increased tube exposure can be realized by increasing the amount of coil from that shown in FIG. 5. The amount of such tube exposure will determine the temperature gradient along heat conductive plate 21.

The function of the heat conductive tube is to provide a fluid path to receive transmitted heat for use in room heating, heating water or use in other systems requiring a heated medium. This heat conductive tube includes means for receiving fluid for transmittance therein and for removing said fluid after heating for conveyance to a point of heat utilization (see FIG. 1).

More specifically, the radiant heat collector 20 is formed from pairs of aluminum sheet metal shape as the heat conductive plates 21 with an heat conductive copper tube 25 held in firm thermal contact at the inner surfaces of the aluminum sheets by means of rivets 26. The exterior, exposed surfaces of the aluminum heat conductive plates are treated with heat absorption means such as NEXTEL TM, marketed by Minnesota Mining and Manufacturing Company, or other suitable black paint to increase absorption of solar radiation.

Insulating material 27 is fixed at the remote edge 28 of the heat conductive plate 21. This material operates to reduce heat losses from the conductive plate. The interior surface 37 of the insulating material 27 is covered with a projecting flange section of the heat conductive plate and is coated with absorptive material to increase heat transfer into the main body of the conductive plate.

The exterior surface of this insulating material 27 may be decorated or otherwise structured to provide for a pleasing aesthetic appearance as part of the interior decor. In fact, wood may be used as the insulating material and can be formed as a decorative casement around the window at the window frame, with the intermediate heat conductive plates and insulative material forming mullions as part of a distinctive design. With respect to the width of the insulating material as viewed in FIG. 2, further discussion will be provided in connection with a description of the moveable reflective surfaces 30 disposed between the respective conductive plates 21.

The principal moving part of the subject invention comprises a light reflective surface 30 positioned in opposing orientation to the heat conductive plate 21 and being operable to direct sunlight from the window opening to the absorbing surface of the conductive plate. This light reflective surface 30 includes means 31 for adjustment thereof from (i) a closed position wherein the reflective surface 30 is advanced to a forward position placing the reflective surface in approximate parallel orientation with the window 11 as illustrated by phantom lines 35 in FIG. 2. In this position substantially all incident radiation is reflected back through the window 11.

The light reflective surface can likewise be adjusted to an intermediate position which is the position illustrated in FIG. 2 for each of the light reflective surfaces 30. This intermediate position constitutes a diagonal orientation with respect to said window for reflection of the transmitted light toward the corresponding heat conductive plate 21. This position provides maximum exposure of the heat conductive plate to incident radiation, and therefore provides maximum heat recovery.

As indicated previously, the heat conductive plate 21 includes a flange or shoulder section 37 which projects laterally to a point no farther than an imaginary line defined by the outermost arc circumscribed by the remote edge of the light reflective surface as it is rotated about its pivotal mounting axis and adjustment means 31. As shown in the figure, this flange section 37 of the heat conductive plate is mounted against the insulating material 27 which likewise projects laterally no further than the imaginary line previously referenced.

Therefore, when the light reflective surface is in the intermediate position illustrated in FIG. 2, all transmitted light 36 is subject to either (i) direct absorption at the heat conductive plate 21 or shoulder section 37, or (ii) reflection from the reflective surface 30 into the heat conductive plate.

The third primary position for the light reflective surface 30 is shown by phantom line position 38 in which the light reflective surface 30 is substantially perpendicular to the window 11. This position is utilized to provide light to the room interior without substantial concern for the recovery of heat or, alternately to provide for passive heating. In the embodiment disclosed in FIG. 2, this represents the limiting position of displacement for the reflective surfaces since, at this point, the back surface of each reflective surface is in near contact with its opposing reflective surface member having a common axis at the adjustment means 31.

With respect to a more specific discussion of the structure illustrated in the preferred embodiment of FIG. 2, the reflectors 30 are installed in pairs and hinged to a support bar which forms the axis and part of the adjustment means 31 for rotation of the reflectors. The configuration illustrated in FIG. 2 is represented by the intersection of two or more planes at oblique angles, the intersection of said planes being parallel with the pivotal mounting axis 31. This structure operates to reflect a greater amount of sunlight toward the heat conducting plate as compared to a flat surface as limited by the illustrated dimensions of FIG. 2. It will be apparent to those skilled in the art that an arcuate reflective surface could be equivalent to the oblique surface 30, and may be desirable where the incident radiation is to be focused in a more local region of the heat conductive plate. Regardless of the type of geometry selected the dimensions of the reflective surface and the heat conductive plate and shoulder must be such that minimum mechanical clearance exists therebetween as the light reflective surface is rotated from the closed position 35 to the intermediate position as illustrated in FIG. 2.

The light reflective surfaces 30 may be fabricated from any material that is resistant to oxidation and has suitable mechanical strength to remain rigid through its path of rotation. Ideally, the material of construction should provide a highly reflective surface on the window-exposed side and a reflective, low emissivity surface on the opposite side exposed to the room interior. COILZAK $_{TM}$, manufactured by the Aluminum Company of America, is a suitable material possessing these characteristics.

The light reflective surface illustrated in FIG. 2 includes means for adjustment 31 which is detailed in FIG. 4. This includes a rigid metal strut 40 which is mounted at its base 41 and top portion to a casement member 42 which traverses the front, base portion of the solar heat recovery device. Light reflective material 43 can likewise be positioned along the base portion of the solar heat recovery device to maximize the efficiency of the heat recovery unit.

The light reflecting surface 30 (FIG. 4) is mounted at the strut 40 by a spring loaded hinge 44. This hinge is mounted to bias the light reflecting surface in the closed position 35 as illustrated in FIG. 2. This spring hinge operates as a failsafe device to pull the reflective surfaces 30 to the closed, light blocking position and thereby prevent overheating or other form of safety hazard.

The reflecting surface 30 is positioned in one of the remaining positions between the closed position of 35 to the fully open position of 38 by means of a flexible cable 45 attached at one end 46 to the opposite side of the light reflective surface and at the other end to a shaft 47 which is adapted with an electric motor or other power means to rotate and wind the flexible cable thereon. This shaft 47 could traverse the full distance of the base casement 42 such that all of the individual flexible cables 45 from each respective reflective surface 30 could be wound onto a single shaft, driven by a single motor. Utilizing this structure, the movement of each of the respective reflective surfaces would be in tandum. It will be obvious to those skilled in the art that other methods for automatically positioning the reflective surfaces, either in tandum for individually, may be implemented. In the embodiment disclosed, the cable and shaft would be concealed behind the base casement 42 to preserve an aesthetic appearance.

FIG. 3 illustrates the appearance of the solar heat recovery device as viewed from the room interior. The trim members 27 and 42 provide a pleasing appearance as part of the room furnishings. The three sets of light reflective surfaces are shown as items 30, with their reflective sides being on the opposing side of the illustrated view.

The electric motor and attached rod 47 can be controlled by a servomechanism sensitive to room temperature, water temperatures, power outages, etc. Numerous forms of servomechanisms may be applied, based on these sensitive parameters and are within the ability of those skilled in the art. Therefore, further explanation of this drive unit is unnecessary. Its operation, however, should include temperature sensitive servomeans which adjust the reflective surfaces to an appropriate position to obtain maximum efficiency of room and water temperature control. Furthermore, it is important that a failsafe feature be included which permits the spring loaded hinge to retract the reflective surfaces to the fully closed position upon power failure, overheating or other emergency condition.

The operation of the solar heat recovery device as illustrated in FIG. 2 develops as incident sunlight 36 is reflected toward the heat conductive plate 21 to thereby raise the temperature of the heat conductive tubes 25 which are contained therein. As illustrated in FIG. 5, increased tube exposure can be developed by curving the path of the heat conductive tube such that it traverses from forward to rearward locations within the plates 25 forming the outside and intermediate columns within the encasement. Likewise, the heat conductive tubes can traverse the upper and lower cap sections to increase the amount of exposure to radiant heat captured within the encasement.

An appropriate fluid, such as water, is forced through the respective heat conductive tubes and operates to conduct the heat out of the solar heat recovery device to heat utilization locations such as a radiant heater unit 50 (see FIG. 1) or to storage tanks 52 to provide a reserve of hot water for later use. Additional explanation will be given hereafter with regard to the complete operation of the system represented by FIG. 1.

As illustrated in FIG. 1, the solar heat recovery device can be adapted with a convection heat collector (identified generally as 55 in FIG. 1) which operates to receive hot air carried by convection current upward in the area adjacent to the reflective surface 30. FIGS. 6 and 7 illustrate this structure and operation. This convection heat collector includes a box-type horizontal duct work 56 positioned above the solar heat recovery device and having an opening at its base to permit intake of heated convection airflow rising from the solar heat recovery unit. A cross-section of this horizontal duct work 56 is illustrated in FIG. 7. Housed within the horizontal duct work are air-to-fluid heat exchangers 60 which are adapted for exposure to the convection airflow.

This convection system can be further adapted with one or more vertical plenums 61 which open at their top to communicate with the cavity of the horizontal duct work and extend at the opposite end toward the floor of the room or structure. This air-to-fluid heat exchanger 60 may be utilized to heat additional water pumped through the exchanger and subjected to the heated convection air, such water being conveyed to a second storage tank for lower temperature water storage.

The recommended air-to-fluid heat exchanger consists of finned tubes 62, 63, 64 and 65. Finned tubes of the type manufactured by SLANT FIN have been found to be satisfactory for this service. The horizontal duct work and vertical plenum system may be constructed of wood or other materials which give some insulation value. A sheet metal liner 66 is recommended for the interior surface of the horizontal duct work for convenience of construction to provide support to the finned tubes. An insulating barrier 67 is disposed between tube pairs 62-63 and 64-65. This configuration provides four passes of the air by the finned heat exchangers.

As illustrated in FIG. 1, the convection heat collector further includes means for conducting a fluid through the finned heat exchanger tubes and to a point of heat utilization, or from a point where cold fluid can be conveyed through the convection heat collector when the unit is used as a cooling system. These inlet and outlet tubes are shown in FIG. 1 as items 70 and 71. It will be apparent to one skilled in the art that the fluid flow in FIG. 1 is designed to follow a fluid path represented in FIG. 7 from 62-63-64-65.

Referring to FIG. 1, fluid storage tanks are disclosed as items 52 and 53. Tank 52 is utilized for storage of relatively high temperature fluid recovered from the radiant heat collector 20. Tank 53 may be used for storage of lower temperature fluids recovered from the convection heat collector 55. Each tank can be adapted with multiple pass heating tubes 75 and 76 to provide indirect heating of water for space heating use when weather conditions are not suitable for utilization of the radiant heat collector 20. Under such circumstances, water or fluids can be conveyed into the tubes within fluid tanks 52 and 53 to heat the water contents, which can then be pumped to radiant heat collector 20 for operation as a space heater. These same tubes 75 and 76 may be utilized to obtain indirect heating of their fluid contents, which may then be passed to a baseboard space heater such as illustrated in item 50. Under such usage, fluid pumps 78 and 79 would then be used to convey the heated water to the space heater 50. By utilizing valve means 80 in appropriate combinations, heated fluid or water can be directed to either the space heater unit 50 or to the radiant heat collector 20. Tube 81 provides a return fluid path from the space heater unit 50 while tube 97 permits fluid return from the radiant heat collector 20. It will be apparent to those skilled in the art that reverse directions could be applied in various aspects of the plumbing between these respective devices without modification to the actual operation and principle of the invention.

Provision is also made in the system illustrated in FIG. 1 for nighttime pumping of water stored in tank 53 via pump 85 and pipe 86 to a sparger 87 on the upper roof 88 of the structure 10. Water pumped to the sparger flows down the roof during nighttime hours, permitting combined evaporative and radiant cooling to take place. The water is collected in a gutter 89 and returned to tank 53 via tubing 90, where it is retained for daytime cooling use.

The cooling step is accomplished by activating pump 91 and pumping cold water from heat transfer tubes 76 in tank 53 via tube 70 to convection heat collector 55 and returning in tube 71 in order to cool air entering the finned heat exchanger from within the room in which the system is installed.

The volume of water within tank 53 is replenished at fluid source 93 via valve 94. This can be automatically controlled by volume sensors within the tank.

Additional elements of the system illustrated in FIG. 1 include an external reflector 13 which functions to redirect solar radiation toward the window 11 for use in the heat recovery system. Additional reflectors can obviously be added, with servodrive mechanisms to maximize radiation collection. It will also be apparent to those skilled in the art that automatic controls, piping and other fluid transfer systems commonly used in the construction of heating, ventilating and air conditioning systems may be incorporated within the invention disclosed herein.

The subject system as represented in FIG. 1 permits several operating modes. These are described categorically as follows:

1. Heat Recovery Operating Mode

Solar radiation, including both direct radiation 14 and indirect radiation 15 passes through window 11 into radiant heat collector 20. During the heat recovery operating mode, the light reflective surfaces 30 (FIG. 2) are automatically rotated to the indicated position in FIG. 2 to direct maximum radiation energy onto the heat conductive plate 21. Water is pumped via circulating pump 96 through heat exchange tubes 75 in tank 52 via tubing 82, radiant heat collector 20, tubing 97 and returning to pump 96. In accordance with this mode, heat is absorbed in radiant heat collector 20 and transferred to tank 52 for storage.

Simultaneously with the above described operation, heated air accumulates within the room interior and adjacent to reflective surfaces 30 of the solar heat device 20. This hot air rises by convection and enters the convection collector 55 (see FIGS. 6 and 7). Air entering this unit through opening 92 passes through the finned surfaces of tubes 62, 63, 64 and 65, and then moves horizontally through the lower section of the horizontal duct work toward vertical plenums 17, where the air then passes downward and reenters the room interior. Water is circulated via pump 91 to these finned tubes via piping 70 and is returned via piping 71 to heat water in tank 53 by means of exchanger tubes 76.

The relative amount of heat recovered in radiant heat collector 20 and convection heat collector 55 depends upon the intensity of solar radiation, outside air temperature, and the temperature of water pumped into each respective unit. Typical operating performance of this system in the heat recovery mode is illustrated in FIG. 8.

FIG. 8 shows the efficiency of the combined radiant heat collector and convection heat collector as a function of the temperature difference between the average temperature of fluid in the radiant heat collector as compared with outside temperature. This value is provided along the X axis of the graph shown. The efficiency is measured at particular insolation values (I) per unit of window area as indicated on the graph. It should be noted that at comparable insolation levels, the total heat recovered is approximately the same as that recovered in a conventional flat plate collector where both systems utilize double glazing. Insolation levels of 350 and 450 are achieved by means of a booster reflector, whereas the lower insolation levels may be obtained at most latitudes without such a reflector.

With respect to the Y axis efficiency percentage, this measurement is based on the total heat recovered within the respective radiant heat collector 20 and convection heat collector 55 as a percent of total window isolation. Typical conditions for these measurements include outside air temperatures ranging from −20° F. to 60° F. and an inlet fluid temperature in the convection heat collector 55 of 60° F. to 70° F. with 90° F. to 110° F. at the outlet thereof. It should be noted, however, that a significant part of unrecovered heat is lost within the house or structure. Therefore, the efficiency indicated in the graph should be interpreted in terms of the fact that additional useful heating is applied to the interior of the structure as a result of heat loss from the system.

FIG. 8 also shows the heat recovered in the radiant heat collector 20 as a percent of total heat recovered, as represented by the dotted lines showing R factors of 80 percent, 60 percent and 40 percent. The graph clearly demonstrates the significant advantage of the present system over conventional rooftop collector systems. Such conventional rooftop systems are not normally equipped with reflector boosters because of overheating problems which may occur during malfunction. In view of the failsafe devices incorporated within the present invention; however, this system may be operated at insolation levels considerably higher than are practical with conventional rooftop collectors. Finally, FIG. 8 illustrates the operating efficiency of the system with the reflector surfaces 30 in the closed position (see item 35 of FIG. 2). In this closed position, the reflectors reject eighty percent or more of the recovered heat when compared with operation in the normal heat recovery operating mode. This is illustrated on that part of the graph identified with the notation-REFLECTORS CLOSED.

2. Low Temperature Level Room Heating Mode

Low temperature level hot water from tank 53 is circulated via pump 79 through either the radiant heat collector 20 or a remote area space heater 50 as determined by zone heating control valves 80 which are disposed at primary locations to respond to low temperature or nighttime minimums. Utilization of low temperature level heat stored in tank 53 conserves heat stored in tank 52 for periods of high heat demand or for domestic hot water heating.

3. High Temperature Level Room Heating Mode

High temperature level hot water from tank 52 is circulated via pump 78 through either the remote area space heater 50 or the radiant heat collector 20, as determined by the zone heating control valves 80 which respond when heat demand is high or at such times when temperature levels in tank 53 have been reduced to temperatures that are insufficient to achieve the room heating desired.

4. Open Window or Daylight Mode

When the reflector surface 30 are moved to the open position 38 (FIG. 2) daylight can be admitted into the room. This would obviously be desirable in overcast weather or in early morning or evening hours. Also, this mode operates as a passive solar heating system.

5. Nighttime Mode

In this mode, reflective surfaces 30 will automatically be positioned in the closed loation 35 to limit heat loss through the window 11. This is significant in view of the fact that some 40 percent reduction in heat loss can be achieved in this mode compared with conventional double glazed windows.

6. Heat Rejection Operating Mode

During the summertime when heat demand is limited to domestic hot water only, or at any time when heat demand is less than the heat recovered, the temperature of water stored in tank 52 will reach a maximum allowable temperature. In this circumstance, surface reflectors 30 will automatically move to the closed position 35 (FIG. 2) and operate in the heat rejection mode. In this mode, a major percentage of radiant energy entering through window 11 is reflected outside the structure. During this mode of operation, comfortable temperatures can be maintained within the interior of the structure with minor heat removal utilizing the convection heat collector 55. This heat rejection mode is also the failsafe mode which is automatically engaged during a power outage or equipment malfunction.

7. Room Cooling Mode

Warm temperature environments can be reduced during summer by utilizing water stored in tank 53 as part of the cooling system. As previously discussed, this water can be cooled by evaporation and radiation cooling utilizing the roof top 88 and water collection system identified in FIG. 1. This cooled water can then be circulated via pump 91 into the convection heat collector to cool the warmer air which has risen to the ceiling of the structure interior. This cooler water operates as a heat sink in combination with the finned heat exchange pipes 62, 63, 64 and 65, and is then returned for cooling in the heat exchange coil 76 within tank 53. This dual-tank system is particularly effective during summer months since it permits storage for domestic hot water usein tank 52, while providing cold water for cooling in tank 53.

It will be apparent to those skilled in the art that modifications may be made to the preferred embodiment as disclosed which may develop additional benefits, without departing from the subject matter of the present invention. Therefore, the subject disclosure is not to be construed to limit the scope of invention set forth herein, except in accordance with the following claims.

I claim:

1. A multi-mode solar heat recovery device for use at an interior surface of a window whose opening permits high transmittance of sunlight while otherwise providing an effective weather barrier, said device including a radiant heat collector, comprising:
   a. at least one heat conductive plate adapted at one edge for fixation near said window, said plate being positioned such that its principal surface would be substantially perpendicular to said window, at least a portion of said surface being adapted with means to provide a high degree of heat absorbtion when exposed to sunlight;
   b. at least one heat conductive tube in thermal contact with said plate, said tube being adapted with means for receiving a fluid therein for removing heat from said plate and with means for fluid conveyance to a point of heat utilization;
   c. a light reflective surface having a variable orientation with respect to and an exposure toward the treated surface of said plate and including means at one edge thereof for pivotal mounting at an axis whose orientation is substantially parallel to and is displaced from said treated surface; and
   d. said light reflective surface, including means for adjustment (i) from a closed position wherein said device is adapted for placement of the reflective surface approximately parallel to said window opening, thereby shielding said treated surface from exposure to sunlight and reflecting substantially all transmitted light back through the window opening, (ii) through an intermediate position wherein the reflective surface is adapted for diagonal placement with respect to said window for reflection of the transmitted light toward the heat conductive plate, (iii) to a fully open position wherein the reflective surface is adapted for substantial perpendicular orientation to said window opening, providing for relatively unobstructed transmittance of said light.

2. A solar heat recovery device as defined in claim 1, further comprising a second light reflective surface, including means at one edge thereof for pivotal mounting adjacent to and parallel with said first pivotal mounting means, said light reflective surface having a solar exposure on an opposite side from the exposure at the first reflective surface, such that the pair of light reflective surfaces are capable of facing in opposite directions, said device further comprising:
   a. a second heat conductive plate adapted at one edge for fixation near said window, said plate being positioned such that its principal surface would be substantially perpendicular to said window, at least a portion of said surface being adapted with means to provide a high degree of heat absorbtion when exposed to sunlight, and being oriented toward said second light reflective surface;

b. said plate including at least one heat conductive tube in thermal contact with said plate, said tube being adapted with means for receiving a fluid therein for removing heat from said plate;

c. said recovery device further comprising means for adjusting said second light reflecting surface from the aforementioned closed position, through the intermediate position and to the fully open position with respect to said window opening.

3. A solar heat recovery device as defined in claim 1, further comprising:

a. a second heat conductive plate in thermal contact on one side with said heat conductive tube, said second plate including means on its second surface to provide a high degree of heat absorbtion;

b. said recovery device further comprising an additional light reflective surface having variable orientation with exposure toward said second absorptive surface and including means at one edge thereof for pivotal mounting at an axis whose orientation is substantially parallel to said second surface of the corresponding plate and is displaced from said plate; said device further comprising means for adjusting said additional light reflective surface from the closed position, through the intermediate position and to the fully opened position with respect to said window opening and said second absorbing surface.

4. A solar heat recovery device as defined in claim 3, wherein the respective heat conductive plates form outside and intermediate columns of an encasement which includes a cap section fixed at the top of the respective heat conductive plates, thus forming a radiant heat collector capable of being installed as a single unit within a window opening.

5. A radiant heat collector as defined in claim 4, wherein the heat conductive tubes of adjacent heat conductive plates are coupled to a common fluid line for transmitting the heated fluid to said point of heat utilization.

6. A solar heat recovery device as defined in claim 4, further comprising a plurality of encasement configurations, which are positioned in side-by-side arrangement and adapted for placement against a large interior window opening.

7. A solar heat recovery device as defined in claim 6, wherein the means for adjusting positions of the reflective surface includes temperature sensitive servomechanical means for automatically positioning the reflective surface selectively at the (i) closed, (ii) intermediate and (iii) open positions.

8. A solar heat recovery device as defined in claim 6, wherein the means for adjusting positions of the reflective surface includes temperature sensitive servomechanical means for automatically positioning the reflective surface to the closed position in the event of power outage or equipment malfunction in order to provide fail-safe protection against high temperatures.

9. A solar heat recovery device as defined in claim 6, further comprising a convection heat collector which includes:

a. a box-type horizontal duct-work, positioned above the solar heat recovery device and with an opening to permit intake of heated convection airflow rising from the solar heat recovery device;

b. an air-to-fluid heat exchanger disposed within said horizontal duct-work and adapted for exposure to the convection airflow;

c. means for conducting a fluid through the heat exchanger and further conducting said fluid to a point of heat utilization; and d. at least one vertical duct, communicating with a base portion of the horizontal duct-work and adapted in length to extend to and open at a location near the lower level of the window opening.

10. A solar heat recovery device as defined in claim 9, wherein a point of heat utilization for said heated fluid includes a second hot water storage tank which is coupled to the convection heat collector and utilizes either direct heating or indirect heating by means of heat exchange, said device including control instrumentation for maintaining the second hot water storage tank at lower temperatures than the hot water storage tank serving the solar heat recovery device, thereby providing an improved overall efficiency made possible by use of two-temperature level heat recovery and heat utilization.

11. A solar heat system as defined in claim 10, further comprising a rooftop evaporation/radiation water cooling system, including means for pumping water from the second water tank, through a sparger located toward the peak of the roof, and to a collecting gutter positioned at the base of said roof to collect the water with means to return said water to said storage tank.

12. A solar heat system as defined in claim 10, wherein the solar heat recovery device is adapted with means for use as a space heater, said means including plumbing for circulating fluid from a water storage tank through the heat recovery device, said reflecting surfaces being adjusted to the closed position.

13. A solar heat recovery device as defined in claim 1, further comprising a plurality of heat conductive tubes, each tube being in thermal contact with said heat conductive plate.

14. A solar heat recovery device as defined in claim 1, wherein the light reflective surface conforms to a configuration represented by the intersection of two or more planes at oblique angles, the intersection of said planes being parallel with the pivotal mounting axis, such that the amount of sunlight reflected toward the heat conducting element will be greater than that provided by a flat surface formed from the same light reflective material.

15. A solar heat recovery device as defined in claim 1, wherein the heat conductive plate is shaped in such a way that minimum mechanical clearance exists between the heat conductive plate and the light reflective surface when the light reflective surface is in either the closed position or in the intermediate position as described in claim 1, paragraph d; providing, however, that no mechanical interference exists when moving the light reflective surface between the referenced closed and open positions.

16. A solar heat recovery device as defined in claim 15, further comprising insulating material fixed to the heat conductive plate at its remote side from said window and extending laterally no farther than a line adjacent to the outermost arc circumscribed by the light reflective surface when rotated about its pivotal mounting axis; and said insulating material having properties which inhibit heat loss from the heat conductive plate.

17. A solar heat recovery device as defined in claim 1, wherein said heat conducting plate is constructed of sheet metal whose thermal conductivity properties provide for maximum heat transfer to the heat conductive tube which is in contact with the sheet metal, and having its exterior side coated with a black heat absorbing material.

18. A radiant heat collector as defined in claim 1, wherein said heat conductive tubes traverse the longitudinal axis of the heat conductive plate in reversing orientation.

19. A solar heat recovery device as defined in claim 1, wherein the light reflective surface comprises a metallic reflector, hinged to rotate at its pivotal mounting axis.

20. A solar heat recovery device as defined in claim 19, wherein the point of heat utilization for said heated fluid comprises an insulated hot water storage tank.

21. A solar heat recovery device as defined in claim 19, wherein the point of utilization for said heated fluid comprises a space heater utilizing either direct heating or indirect heating by means of heat exchange elements associated with the storage tank.

* * * * *